US008260258B1

(12) United States Patent
Li et al.

(10) Patent No.: US 8,260,258 B1
(45) Date of Patent: Sep. 4, 2012

(54) METHOD OF TARGET PROVISIONING FOR LAWFUL INTERCEPT IN IP MULTI-MEDIA SERVICE NETWORKS

(75) Inventors: Mingxing Li, San Jose, CA (US); Phillip Andrew Ritter, Danville, CA (US); Xuming Chen, San Ramon, CA (US)

(73) Assignee: Cellco Partnership, Basking Ridge, NJ (US)

( * ) Notice: Subject to any disclaimer, the term of this patent is extended or adjusted under 35 U.S.C. 154(b) by 956 days.

(21) Appl. No.: 12/119,845

(22) Filed: May 13, 2008

(51) Int. Cl.
*H04M 1/66* (2006.01)
(52) U.S. Cl. ......... 455/410; 455/466; 370/235; 370/352
(58) Field of Classification Search .................. 455/410, 455/466; 370/252, 235
See application file for complete search history.

(56) References Cited

U.S. PATENT DOCUMENTS

| | | | |
|---|---|---|---|
| 2002/0159578 A1* | 10/2002 | Bern et al. ............... | 379/219 |
| 2004/0157629 A1* | 8/2004 | Kallio et al. .............. | 455/466 |
| 2004/0255126 A1* | 12/2004 | Reith ....................... | 713/183 |
| 2005/0027866 A1 | 2/2005 | Seurujarvi et al. | |
| 2008/0013533 A1 | 1/2008 | Bogineni et al. | |
| 2008/0137541 A1* | 6/2008 | Agarwal et al. ........... | 370/241 |
| 2010/0039946 A1* | 2/2010 | Imbimbo et al. .......... | 370/252 |

OTHER PUBLICATIONS

3rd Generation Partnership Project; Technical Specification Group Services and System Aspects; 3G security; Handover interface for Lawful Interception (LI) (Release 7); 3GPP TS 33.108 V7.6.0, Sep. 2006.
PacketCable™ 2.0, Electronic Surveillance Intra-Network Specification, PKT-SP-ES-INF-I03-070925, Sep. 25, 2007.
PacketCable™ 2.0, PacketCable Electronic Surveillance, Delivery Function to Collection Function Interface, Specification, PKT-SP-ES-DCI-I02-070925, Sep. 25, 2007.
PacketCable™ 2.0, Control Point Discovery Interface Specification, PKT-SP-CPD-I03-070925, Sep. 25, 2007.
Verint Systems, The IP Multimedia Subsystem (IMS), Technical Brief, Jan. 2007.
NEC Network Laboratories, Tutorial—Presence and IP Multimedia Subsystem (IMS) Services, Jan. 19, 2004, Heidelberg, Germany.

* cited by examiner

*Primary Examiner* — Patrick Edouard
*Assistant Examiner* — Michael Irace (57) ABSTRACT

Provisioning of target related information into an IP Multimedia Subsystem (IMS) communications network, to provide lawful intercept, utilizes an interface between a lawful intercept server (LIS) and one or more of the Home Subscriber Servers (HSSs) of the network. The LIS provisions an HSS with target information for LI, with respect to a subset of the overall list of LI targets, that is to say with respect to those of targets homed on the respective HSS. The HSS provisions the target list for its subset down to Call Session Control Function elements (CSCFs) logically attached to that HSS, to enable each CSCF to intercept signaling messages relating to communication for identified target user equipment (UE) devices. The intercepted signaling enables the LIS to identify a location of a target UE device in an access network and instruct a network control point to intercept content of communications for that UE device.

20 Claims, 7 Drawing Sheets

FIG. 7
(Background)

METHOD OF TARGET PROVISIONING FOR LAWFUL INTERCEPT IN IP MULTI-MEDIA SERVICE NETWORKS

TECHNICAL FIELD

The present subject matter relates to techniques and equipment to provision target related information into elements of an IP Multi-media Subsystem (IMS) based communications network, to provide lawful intercept.

BACKGROUND

Communication networks are undergoing a rapid evolution from circuit switched technologies, originally developed for voice communications, to packet switched technologies. The packet technologies were originally developed for data communications, but as speed has increased and the technologies have evolved, the packet networks have been able to provide generic transport for all forms of information (voice, video, multimedia, text, etc.). Next generation networks providing end-to-end packet transport, typically, based on Internet Protocol (IP) packets, are already being deployed in many areas.

IP Multi-media Subsystem (IMS) is a new service architecture developed for IP type packet switched networks for rapidly deploying new IP based multi-media services. Originally developed as an extension of GSM (Global System for Mobile) type wireless networking standards, the IMS paradigm has been extended to other types of wireless/mobile network technologies as well as landline networks, particularly for advanced digital cable television/telephone network deployments. The architecture has been in development in 3GPP and 3GPP2 for several years. The development of the major framework is largely completed or in the process of completion. Early IMS products are becoming available from various manufacturers for lab or field trials and deployment.

For commercial development of any communication network, lawful intercept (LI) capability is often a mandatory requirement in most countries/regions. In the US, lawful intercept is mandated by Communications Assist to Law Enforcement Agency (CALEA) law. To support this LI mandate in the context of the new IMS architecture, some standards work has been done in the area of lawful intercept, notably in 3rd Generation Partnership Project (3GPP), Technical Specification Group Services and System Aspects, 3G security, *Handover Interface for Lawful Interception (LI)*, V7.6.0, September 2006; and PacketCable™ 2.0, *Electronic Surveillance Intra-Network Specification*, PKT-SP-ES-INF-I03-070925, Sep. 25, 2007.

Figure 5:
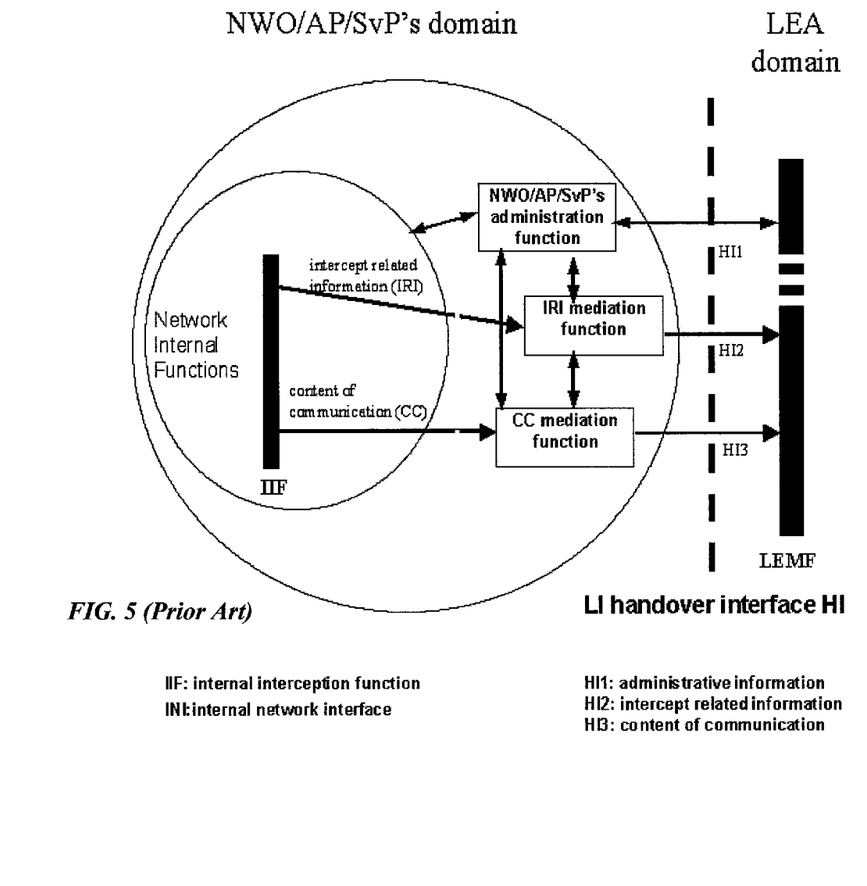
FIG. 5 depicts the handover interface between an IMS service provider and a Law Enforcement Agency (LEA), as specified at a high-level by existing standard and discussed in the background section above.

In 3GPP, work on support of LI has primarily focused on the handover interface between an IMS service provider and a Law Enforcement Agency (LEA), as illustrated in the high-level block diagram of FIG. 5. This interface specifies the protocol messages between the service provider and the LEA. It, however, does not specify the protocol, messages, or format to be used to provision information identifying the targets of the LI from an LI administration function (also called LI Server, or LIS). Neither does the 3GPP specify aspects of how to intercept a call, such as intercept access points to be used for completed call scenarios, the protocols to be used to pass intercepted content to mediation functions, etc.

Figure 6:
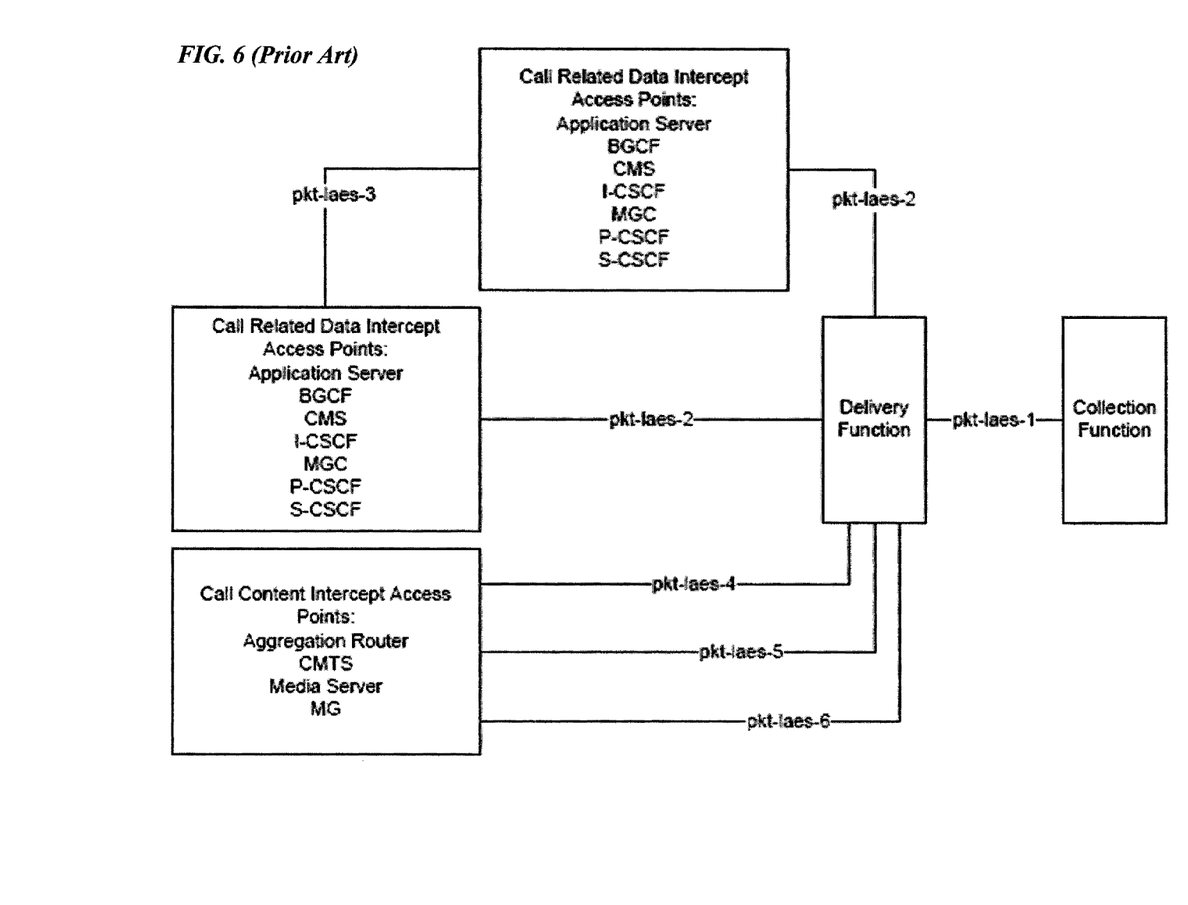
FIG. 6 illustrates further interfaces as recently proposed by the PacketCable 2.0 standard.

The recent PacketCable 2.0 standard cited above moves one step further by specifying not only the handover interface (The pkt-laes-1 interface), but also Intercept Access Points (IAPs), IMS internal network interfaces between IMS components (pkt-laees-3), and IMS components and LI delivery function (pkt-laes-2, pkt-laes-4, pkt-laes-5, and pkt-laes-6) as shown in FIG. 6. PacketCable 2.0 assumes that all Call Session Control Functions (CSCFs) are provisioned with lists of the LI targets, but it does not specify the interface between CSCFs and the LI administration function at the LIS (not shown in above diagram). The method and interface protocol are left open. Different methods could be used.

Figure 7:
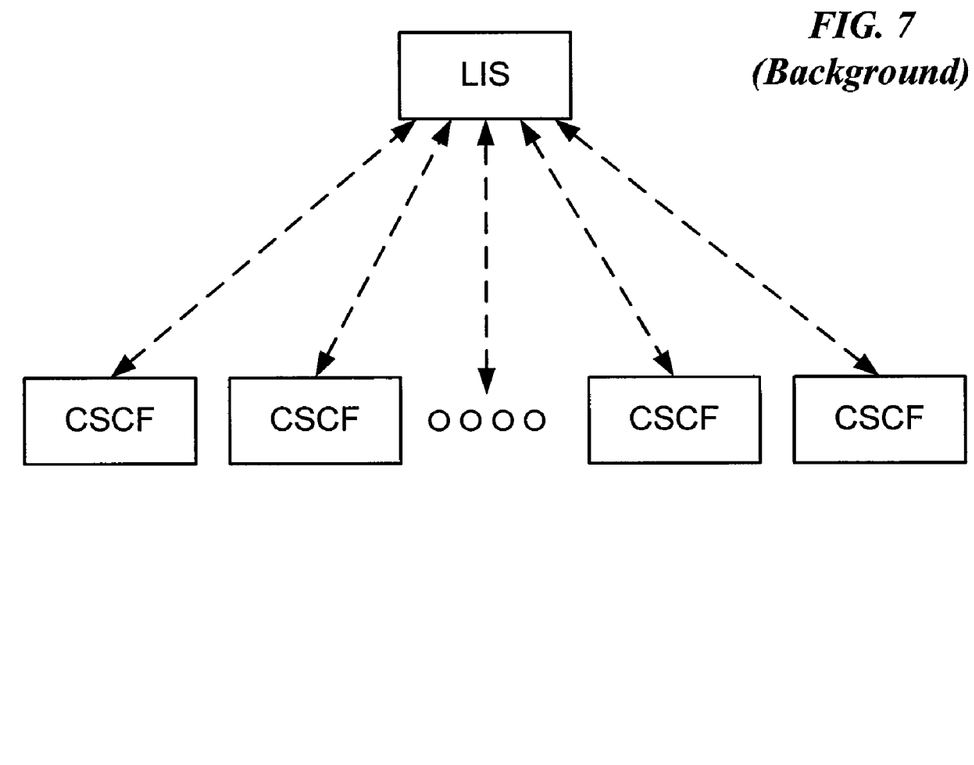
FIG. 7 illustrates a background solution in which LIS interfaces with each CSCF directly and provisions a complete list of LI targets onto each CSCF.

One straight-forward method of provisioning target information from the LIS would be to have the LIS interface directly with each CSCF, as shown in FIG. 7. In this method, the LIS provisions a complete list of LI targets onto each CSCF. The reason to have a complete list at each CSCF is because it is unknown prior to registration which CSCF will end up being assigned to serve a previously unregistered User Equipment (UE) device that will be a surveillance target for LI purposes. However, there are a few drawbacks with this approach.

First of all, there is no standard interface between the LI Server and a CSCF. Each CSCF vendor tends to design and implement their own proprietary interfaces. For a multi-vendor IMS service provider, this could mean implementation of different proprietary interfaces on the LIS for various CSCFs from different vendors. The cost of development and maintenance of LIS and CSCF interfaces would likely become significant.

Another major drawback is the number of interfaces with which each LIS has to manage. In a medium to large sized network, the number of CSCFs could become significant. Any addition or removal to CSCF would mean changes to LIS configuration and requires associated testing.

Hence a need exists for more effective techniques allowing a network operator/service provider to provision appropriate network elements with surveillance target related information, to allow the network to efficiently meet requirements for lawful intercept.

SUMMARY

The teachings herein provide an improved technique of LI target provisioning for IMS type networks. The disclosed approach may be used in conjunction with PacketCable 2.0 or other (standard or non-standard) lawful intercept methods to deliver a complete LI solution for IMS networks, for either fixed/landline networks or wireless/mobile networks that utilize an IMS service architecture.

For example, the detailed description below discloses a method of provisioning surveillance target information, for lawful intercept, in an Internet Protocol (IP) Multi-media Subsystem (IMS) communications network. The method involves receiving a target list containing information regarding one or more user equipment (UE) devices identified as surveillance targets for lawful intercept, from a Lawful Intercept Server (LIS) at one Home Subscriber Server (HSS). The HSS is one of those of the IMS communications network. The one or more UE devices identified in the received target list form a subset less than all UE target devices under surveillance by the LIS. Also, the one or more UE devices identified in received target list are among the UE devices homed on the one HSS for service through the IMS communication network. The UE devices homed on the one HSS form a subset less than all UE devices provisioned for service through the IMS communication network. The exemplary method also involves provisioning the received target list from the one HSS to Call Session Control Function elements (CSCFs) logically attached to the one HSS. This enables the CSCFs to supply intercepted signaling for communications through the network for the one or more UE devices identified by the information in the target list to the LIS for the lawful surveillance.

In a specific example, the LIS maintains uses a Diameter Dh interface with a Subscriber Location Function (SLF) to query for and obtain an HSS address for a particular LI target. The SLF may be a centrally located function or implemented by one of the HSS elements of the IMS communications network. The LIS maintains and uses a Diameter Sh interface with the HSS for storing and propagating LI target list to CSCFs. In the system example, the HSS includes a storage for the LI target list. The LIS encrypts the LI target list before sending it to the appropriate HSS, and the HSS stores the received LI target list using a Public Service Identifier (PSI) assigned for lawful intercept purposes to reference the stored encrypted target list. Each CSCF maintains a Diameter Sh interface with HSS, to monitor and receive an updated LI target list from the PSI storage in the HSS. The CSCF is provisioned with the appropriate key to decrypt the LI target list once it receives the list from storage in the HSS.

In addition to disclosed provisioning techniques, the detailed description also encompasses a network and an arrangement within the network, configured for provisioning in support of lawful intercept.

Hence, in an IMS communications network comprising HSSs and CSCFs, an arrangement for supporting lawful intercept includes one of the HSSs and a number of the CSCFs which are logically attached to the one HSS. In this arrangement, the one HSS is configured for receiving a target list containing information regarding one or more UE devices identified as surveillance targets for lawful intercept, from a LIS. The one or more UE devices identified in the received target list form a subset less than all UE target devices under surveillance by the LIS. The one or more UE devices identified in the received target list are among UE devices homed on the one HSS for service through the IMS communication network. The UE devices homed on the one HSS form a subset less than all UE devices provisioned for service through the IMS based communication network. The one HSS is further configured to notify the CSCFs which are logically attached to the one HSS of the availability of the received target list. Each of the CSCFs is configured to obtain the received target list from the one HSS, in response to notification of availability from the one HSS. Each CSCF will supply intercepted signaling for communications through the network for the one or more UE devices identified by the information in the target list to the LIS for the lawful surveillance.

As noted, the disclosure also covers an IMS communications network. Such a network includes radio access networks, for providing wireless mobile communications service to UE devices. CSCFs, associated with each respective one of the radio access networks, control communication sessions for UE devices through elements of the respective radio access network. The network also includes a number of HSSs. Each HSS has group of the CSCFs logically attached thereto. The HSSs provide database services to the CSCFs regarding UE devices obtaining service through the IMS communication network. Each one of the HSSs implements a communication interface for receiving a respective target list containing information regarding one or more UE devices identified as surveillance targets for lawful intercept, from a LIS. The respective target list is received from the LIS, and it includes information on one or more UE devices forming a subset less than all UE target devices under surveillance by the LIS. The one or more UE devices identified in the respective target list are among the UE devices homed on the one HSS for service through the IMS communication network from among all devices obtaining service through the IMS communication network. Each HSS includes storage for storing the respective target list received from the LIS. The HSSs and the CSCFs implement a communication interface therebetween for communication regarding lawful interface. Via this later interface, each group of the CSCFs obtains the respective target list from storage in one of the HSSs. Each of CSCFs is configured to supply intercepted signaling for communications through the network for the one or more UE devices identified by information in the respective obtained target list, to the LIS for the lawful surveillance.

The proposed method provides any or all of several benefits. For example, instead of having LI administration interfaces with all CSCF components, the described method interfaces with one HSS or with a very small number of HSSs. This greatly simplifies the deployment, management and network maintenance. The described method allows CSCFs to be moved around from one Home Subscriber System (HSS) to another, without requiring changes or reconfiguration to LI administration component or LIS. Adding more CSCFs also does not require a change to the LI Server, because the LI Server can still communicate target provisioning information with the HSS(s) of the IMS network. This further simplifies the OA&M for LI. In contrast to provisioning all targets onto each CSCF, the described method provisions only a subset of the targets onto each CSCF. As a result, each CSCF has fewer targets to compare with when a call is processed, reducing the workload on the CSCF elements. The exemplary method achieves all above benefits via existing standard interface protocols, such as Diameter Dh and Sh interfaces. Hence, a protocol extension to an existing IMS standard is not required.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Applicants have made the following deployment observations with regard to planned deployments for medium to large scale IMS networks:
1. IMS subscribers tend to be homed onto multiple Home Subscriber Servers (HSSs), with each HSS homing a subset of (but not all of) the IMS subscribers.
2. The ratio of HSSs to CSCFs is 1:N. In medium to large sized networks, the number of CSCFs is more than the number of HSS (that is to say that N>1).
3. CSCFs are partitioned into groups based on HSS. Each HSS has a group of CSCFs logically attached to it. In a real deployment, each HSS with attached CSCFs can be associated with a particular operational organization, e.g. a particular access network.

Based on these observations, a technique described below has been developed to provision target related information into elements of the IMS based communications network, to provide lawful intercept. In the examples, the LIS provisions each HSS with target information for LI, with respect to a subset of the overall list of LI targets, that is to say with respect to only those of the targets that are homed on the respective HSS. The respective HSS, in turn, provisions the target list for its subset down to the CSCFs attached to or otherwise associated therewith. Once provisioned, one of the CSCFs will copy and deliver to the LIS (intercept) all signaling messages relating to any communication to, from or otherwise for an identified user equipment (UE) device of the target. Based on information contained in the delivered signaling message(s), the LIS will identify a location of the device in an access network and can instruct a control point of the access network to copy and deliver content of the communication for the user equipment device.

Provisioning methodologies in accordance with the examples discussed may result in a number of benefits. For example, instead of having LI administration interfaces with all CSCF components, the described method interfaces with one, or a very small number of, HSS servers. This greatly simplifies the deployment, management and network maintenance. The methodology allows CSCFs to be moved around from one HSS to another, without requiring changes or reconfiguration to LI administration component or LI Server (LIS). Adding more CSCFs also does not necessitate changes to the LIS. This further simplifies the operations, administration and maintenance (OA&M) for LI. In contrast to provisioning all targets onto each CSCF, the methodology described below provisions only a subset of the targets onto each CSCF. As a result, each CSCF has fewer targets to compare with when each call is processed, reducing the workload on CSCF. Also, the HSS to CSCF interface exists and need not be modified to permit the HSS to push down the LI target provisioning data. The provisioning to the HSS by the LIS also can use an existing interface. Hence, the disclosed methodology achieves at least these benefits via existing standard interface protocols, and a protocol extension to an existing IMS standard is necessarily not required.

Figure 1:
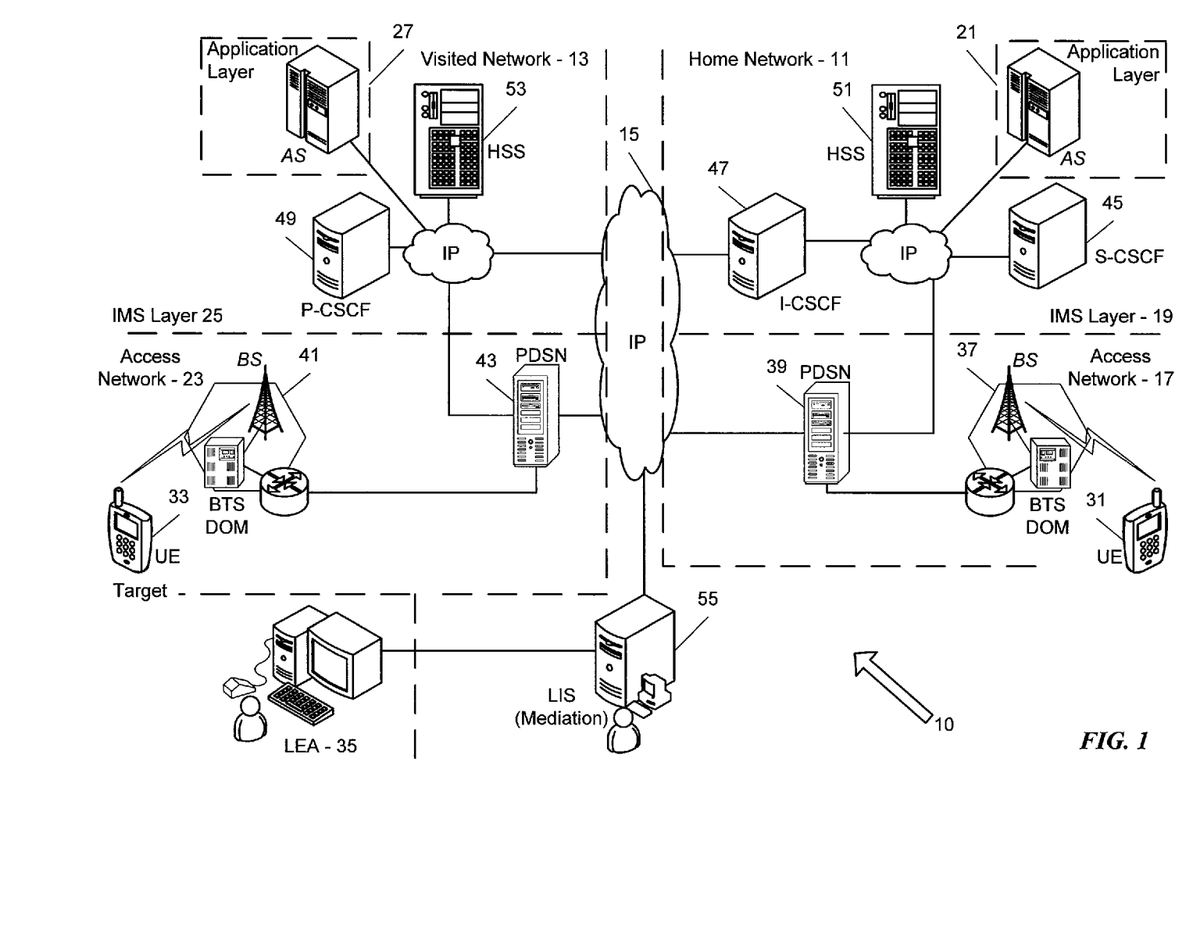
FIG. 1 is a simplified functional block diagram of visited and home networks, based on an IMS architecture, as well as elements involved in lawful intercept.

Reference now is made in detail to the examples illustrated in the accompanying drawings and discussed below. Before discussing specific examples of the provisioning methodology, it may be helpful to first discuss an example of the IMS architecture in which such a methodology may be practiced. FIG. 1 illustrates the elements of IMS based networks as may be involved in communications subject to lawful intercept as well as the LEA and the LIS for lawful surveillance of targets obtaining communications services through one or more of the networks.

For purposes of discussion, the example of FIG. 1 shows an IMS communications network 10 two service provider networks 11 and 13 interconnected by IP network 15. As discussed more later, we will assume that the target is homed on the network 11 and is visiting the network 13. The networks 11 and 13 may be operated by the same service provider or carrier, e.g. in different geographic regions; or the networks 11 and 13 may be operated by different service providers/carriers.

The IMS architecture paradigm assumes essentially a three layer arrangement of each IMS-based network. The lower layer is the access network layer. This layer provides the actual content and signaling communications to and from the user equipment (UE) devices, for the various multimedia services supported by the respective network 11 or 13. The IMS paradigm is relatively agnostic with respect to the network layer technology, in that the higher layers may be used with any IP-based access network technology that is capable of supporting the multimedia communications and is configured to use the standard signaling interfaces to the higher layers. The IP multimedia subsystem or IMS layer provides a variety of service control related functions as well as the interface between the access network layer and the top layer application functions. For purposes of this discussion, the IMS layer and application layer are simplified, for focus on elements as may be involved in LI.

As noted, in our example, both the home network 11 and the visited network 13 are IMS-based networks. Hence, the home network 11 includes an access network 17, an IP multimedia subsystem or IMS layer 19 and one or more servers forming an application layer 21. Similarly, the visited network 13 includes an access network 23, an IP multimedia subsystem or IMS layer 25 and one or more servers forming an application layer 27.

For discussion purposes, we will assume that the access networks 17 and 23 utilize an appropriate CDMA cellular network technology, such as 1xEvDO. However, those skilled in the art will recognize that the present discussion of LI in IMS based networks is applicable to implementations using other wireless or mobile access technologies as well as to implementations using fixed network technologies in some or all of the access network(s). Also, for ease of illustration and discussion, it is assumed that both access networks utilize similar mobile network technologies, although obviously the different networks could utilize different access technologies, particularly where users have equipment capable of communications via the different available mobile or wireless technologies.

The wireless access network 17 provides packet communication services for numerous mobile stations. For discussion purposes, however, the drawing shows a single UE device 31 operating in that wireless access network 17, and a similar UE device 33 is shown operating in the wireless access network 23. Either or both of the devices 31, 33 may be the target(s) of LI for purposes of surveillance by an law enforcement agency (LEA) such as shown at 35 in the drawing.

Each mobile type UE device 31 or 33, for example, may take the form of a mobile telephone station, with display and user input capabilities to support multimedia communications. Today, such mobile telephones implementations of the devices typically take the form of portable handsets, although they may be implemented in other form factors. As another class of station examples, the mobile device may take the form of a personal digital assistant (PDA) or a portable personal computer (PC), incorporating a wireless transceiver compatible with the particular type of wireless packet data service offered by the networks 11 and 13. Of course, the mobile stations may take other forms or connect to a variety of other data devices.

Physical elements of the mobile radio access network 17 include a number of base stations (BSs) 37, only one of which is shown for convenience. Each base station 37 includes an antenna system and a base transceiver system (BTS). The base transceiver system (BTS) communicates via the antenna system and the air-link with one or more of the mobile stations, when the mobile stations are within range. The BTS is the part of the radio access network that sends and receives radio frequency signals carrying packets to/from the mobile stations that the base station 37 currently serves. In the example, the BTS communications over the air link with the wireless UE device 31 provide the High Rate Packet Data Interface (HPRD) for client data services. From the mobile station perspective, there will often be two or more base stations within range. The mobile device 31 communicates through the BTS of base station 37, selected from among those base stations that it can detect (approximately within range) over the air, ending up with the BTS that provides the best Channel-to-Interference ratio.

In the 1×EvDO example, the BTS includes or is associated with a DOM (data optimized module) that controls the wireless packet communications through the BS 37 and the HPRD wireless domain, including scheduling of packet transmissions on the forward link(s), in this example of the wireless portion of the radio access network 17. An IP backhaul segment may connect the BTS to a Radio Network Controller, typically located in a Mobile Switching Center, although for convenience, such elements are omitted from the simplified illustration of FIG. 1. The radio access network 17 also includes a number of Packet Data Serving Nodes or "PDSNs" 39 (CDMA type networks or GGSN deployed in GSM networks), one of which is shown in the drawing for simplicity. The PDSNs 39 establish, maintain and terminate logical links to the associated portion of the radio access network 17, support point to point protocol (PPP) sessions with the mobile stations 31 and provide the packet routing function from the radio access network to/from other packet switched networks, in this case via the IP network 15, e.g. for Internet or Intranet access and for packet based communications with other networks such as the access network 23.

In the example, the mobile radio access network 23 utilize a similar architecture and similar components. Hence, in our example, physical elements of the radio access network 23 include a number of base stations (BSs) 41, only one of which is shown for convenience. Each base station 41 includes an antenna system and a base transceiver system (BTS). The base transceiver system (BTS) communicates via the antenna system and the air-link with one or more of the mobile stations 33, when the mobile stations 33 are within range. The BTS is the part of the radio access network 23 that sends and receives radio frequency signals carrying packets to/from the mobile stations that the base station 41 currently serves. In the example, the BTS communications over the air link with the wireless UE device 33 provide the High Rate Packet Data Interface (HPRD) for client data services. The BTS includes or is associated with a DOM that controls the wireless packet communications through the BS 41 and the HPRD wireless domain, including scheduling of packet transmissions on the forward link(s), in this example of the wireless portion of the radio access network 23. An IP backhaul segment may connect the BTS to a Radio Network Controller, typically located in a Mobile Switching Center, although for convenience, such elements are omitted from the simplified illustration of FIG. 1. Like the radio access network 17, the radio access network 23 also includes a number of PDSNs 43 (one of which is shown for simplicity), to establish, maintain and terminate logical links to the associated portion of the radio access network 17, support PPP sessions with the mobile stations 33 and to provide the packet routing function from the radio access network 23 to/from other packet switched networks, in this case via the IP network 15.

The IMS based networks 11 and 13 utilize SIP as the signaling protocol for control of multimedia sessions or "calls" to and from the users' mobile stations 31, 33 receiving service through the networks. Hence, each application layer 21 or 27 includes SIP based application servers (ASs), for SIP based services offered by the respective network operator and/or by third party service providers. A SIP based application server (AS) is responsive to the SIP protocol signaling messages and provides a service execution environment for the particular application(s) for the service(s) the particular server supports, e.g. voice telephone service, video telephone service, push-to-talk (PTT), etc.

As noted, the IMS layer of the networks provides a variety of service control related functions as well as the interface between the access network and the top layer application functions. For example, this layer authenticates users and their UE devices 31, 33 and controls elements of the access network layer to allow signaling communications to the application layer elements and subsequent content transport through the access networks 17, 23, for authenticate users/devices. Hence, in the IMS layer, There are a number of Call Session Control Functions (CSCFs). The Proxy Call Session Control Function (P-CSCF) enables the session control to be passed to a Serving CSCF. The Serving CSCF (S-CSCF) is in the home network and invokes the actual service logic, for control of the services provided to the user of the UE device. The Interrogating CSCF (I-CSCF) operates on the border or boundary between to service providers' networks at the IMS layer, and the I-CSCF effectively hides the location of CSCFs of the one provider from the outside, e.g. from CSCFs and other devices of the other provider. When signaling for a session reaches the I-CSCF, it identifies the S-CSCF currently serving a destination user from the HSS and forwards the SIP signaling to the identified S-CSCF.

Both IMS layers 19, 25 will typically include all three types of CSCF functional elements. However, for purposes of discussing examples of LI and associated provisioning, we will assume that the UE device 33 is that of a surveillance target, and that the device 33 is homed to the network 11 but operating in the visited network 13. Hence, the drawing shows CSCF elements of the network 11 involved in 'home' network control vis-á-vis the device 33 and elements of the network 17 involved in 'visited' network control with respect to the targeted user's UE device 33. In our example, the home network IMS layer 19 therefore includes an S-CSCF 45 and an I-CSCF 47, whereas the visited network IMS layer 25 includes a P-CSCF 49.

The IMS architecture separates control and database functions. Hence, the actual call control functions are implemented in the CSCF elements. However, the associated database and related authentication/service authorization functions are implemented in elements referred to as Home Subscriber Servers (HSSs). Hence, the IMS layer 19 of the home network 11 includes one or more HSS servers, one of which is shown at 51 in the simplified drawing. Although not directly involved in call handling for the visiting UE device 33, the IMS layer 25 of the visited network 13 will typically include one or more HSS servers 53, for performing similar functions for devices/users homed on the network 13.

One or both of the networks 11, 13 will have or connect to a lawful intercept server (LIS) 55, which performs a variety of functions in relation to LI, referred to collectively as "mediation." Lawful surveillance may require intercept of session related signaling as well as intercept of content, and the LIS 55 delivers the intercepted signaling and/or content to the equipment of the LEA 35. Of note for purposes of this discussion, when the LEA obtains a court order for surveillance, the LEA 35 identifies the target to the LIS 55, and the LIS provisions the relevant target information into appropriate equipment in one or more of the networks 11, 13, so as to cause the IMS communications network 10 to intercept and deliver the signaling and/or content with respect to communications of any and all UE devices of the target. In accord with the present teachings, this involves provisioning communications from the LIS 55 to one or more of the HSSs, typically one of the HSSs 51 on which the target user's UE device 33 is homed. The HSS 51 in turn provisions one or more CSCFs with which it is associated, in this example, the S-CSCF 45. As a result, the S-CSCF 45 will deliver copies of any and all signaling messages that it receives, with regard to calls for the UE device 33, to the LIS 55, for forwarding to the LEA 35.

The signaling information will also allow the LIS 55 to communicate with a PDSN or other control point (e.g. gateway) serving the UE device 33 to cause the control point to deliver copies of any and all packets containing content data for the UE device 33, to the LIS 55, for forwarding to the LEA 35. The LIS 55, for example, may utilize control point discovery methodology to identify the control point in the access network to replicate and deliver the target's content to the mediation function of the LIS 55. The LIS 55 knows the IP address of the UE device 33 that the target is currently using, from the SIP signaling received from the relevant CSCF. Using that IP address, the LIS 55 sends a Control Point Discovery (CPD) message toward that UE device 33. A control point in the path between the LIS 55 and the UE 33, such as the PDSN 43 (or a media gateway, etc.), recognizes the CPD message and responds back with the IP address to use for the particular application. The LIS 55 then uses the IP address from the response to make the necessary request for that application to replicate and deliver the target's content to the LIS 55, for forwarding to the LEA 35. For further information regarding the CPD methodology and associated protocols, attention may be directed to PacketCable™ 2.0, *Control Point Discovery Interface Specification*, PKT-SP-CPD-I03-070925, Sep. 25, 2007.

Figure 2:
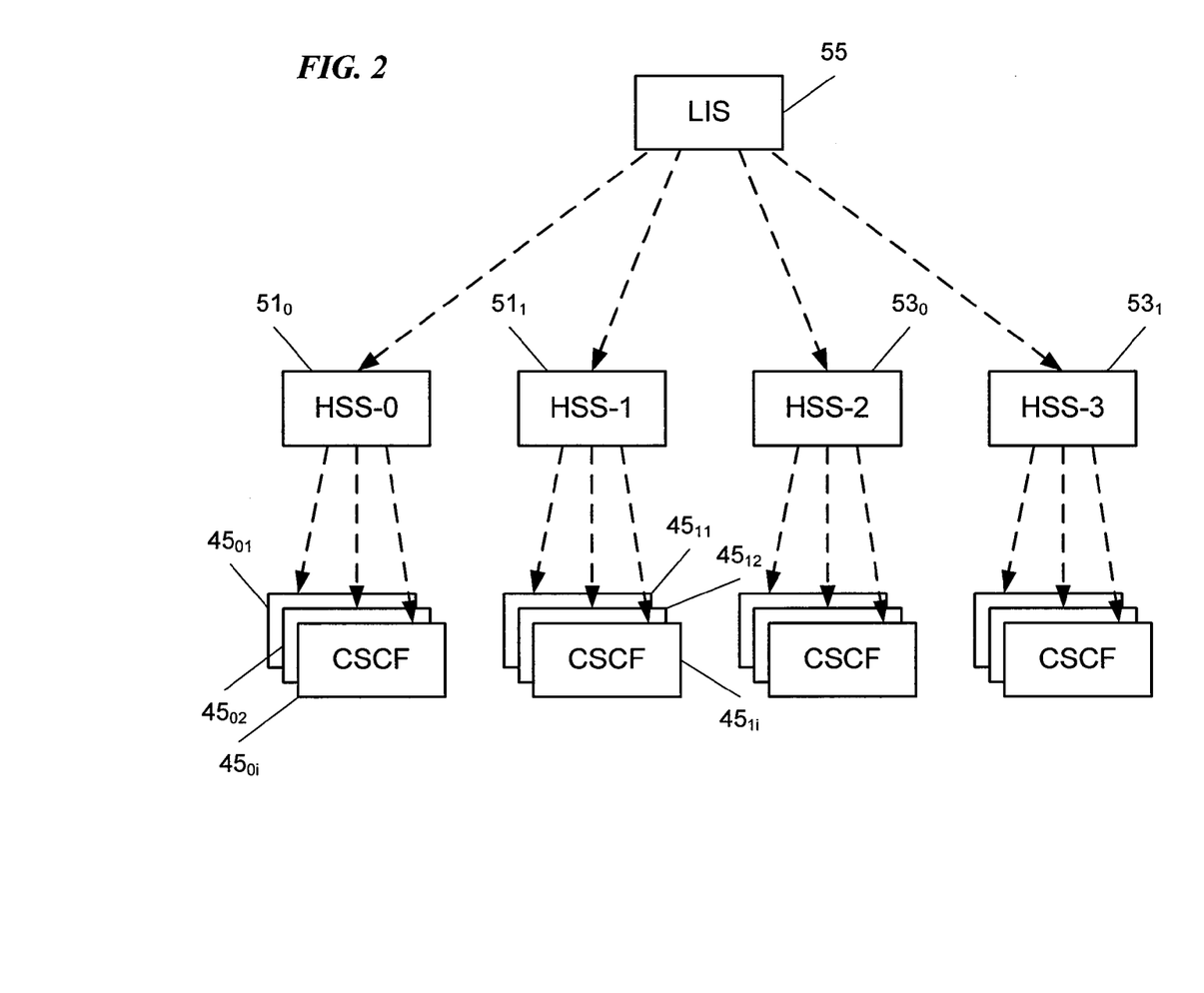
FIG. 2 is a simplified diagram illustrating a high level view of the proposed method of provisioning LI target information onto CSCFs via HSSs.

With that general introduction, using an exemplary network, it may be helpful now to discuss procedures for provisioning of LI target information, in somewhat more detail. FIG. 2 illustrates the high level view of the proposed method of provisioning LI target information onto CSCFs. In the diagram, LIS 55 is the LI provisioning/administration platform. In contrast to having LIS interface with the more numerous instances of CSCF, the LIS 55 interfaces with a number of HSSs. In a typical implementation, each network 11 or 13 will include two ore more instances of an HSS. Hence, in our example, the overall IMS network 11 might include four or more HSSs represented by HSSs $51_0$, $51_1$, $53_0$ and $53_1$, in the drawing. The HSSs in FIG. 2 therefore represent multiple instances of the HSS 51 or 53 in the networks 11 and 13 in the example of FIG. 1.

Each HSS comprises a user or subscriber database and provides related authentication/service authorization functions with respect to UE devices and services to be provided to users of such devices. Within the IMS network 10, groups or sets of users and thus their devices are 'homed' on respective HSSs. Stated another way, UE devices homed on one HSS 51 or 53 form a subset (less than all) of the UE devices provisioned for service through the IMS communication network 10. Hence, HSS $51_0$ will have a database of information regarding a first group of IMS users and their UE devices homed on that HSS in the network 11, whereas the HSS $51_1$ will have a database of information regarding a first group of IMS users and their UE devices homed on that HSS in the network 11. Similarly, HSS $53_0$ will have a database of information regarding a first group of IMS users and their UE devices homed on that HSS in the network 13, whereas the HSS $53_1$ will have a database of information regarding a first group of IMS users and their UE devices homed on that HSS in the network 11.

As shown in FIG. 2, the LIS 55 will supply respective target lists to the various HSSs 51, 53. The lists contain information regarding one or more UE devices identified as surveillance targets for lawful intercept. For each HSS, the list supplied will be a subset (but not all) of the targets under surveillance by the LIS 55. The list supplied to a particular HSS will include information with respect to only those of the targets that are among the users/devices homed on the particular HSS. Hence, in the example, the list supplied to the HSS $51_0$ will include information with respect to only those of the targets that are homed among the UE devices on the HSS $51_0$. Similarly, the list supplied to the HSS $51_1$ will include information with respect to only those of the targets that are among the UE devices homed on the HSS $51_1$. The list supplied to the HSS $53_0$ will include information with respect to only those of the targets that are among the UE devices homed on the HSS $53_0$, whereas the list supplied to the HSS $53_1$ will include information with respect to only those of the targets that are among the UE devices homed on the HSS $53_1$.

In medium to large sized IMS networks, the number of CSCFs is more than the number of HSS. Hence, each HSS has a group of the CSCFs logically attached thereto. The group of CSCFs may include any or all of the various types of CSCFs discussed above. In the example illustrated in FIG. 2, each HSS 51 or 53 has three or more (1 to i) CSCFs logically attached thereto. For purposes of discussion of an example, we will assume now that the CSCFs are S-CSCFs. Hence, the HSS-0 $51_0$ has a number of attached or otherwise associated CSCFs $45_{01}$ to $45_{0i}$, the HSS-1 $51_1$ has a number of attached or otherwise associated CSCFs $45_{11}$ to $45_{1i}$, etc.

The exemplary method also involves provisioning the received target list from the respective HSS to the group of CSCFs logically attached to the particular HSS. Hence, in the example, the HSS-0 $51_0$ supplies the list it received from the LIS 55 to the attached or otherwise associated CSCFs $45_{01}$ to $45_{0i}$, the HSS-1 $51_1$ supplies the list it received from the LIS 55 to the attached or otherwise associated CSCFs $45_{11}$ to $45_{1i}$, etc.

Receipt of the lists enables the CSCFs to supply intercepted signaling for communications through the network for the one or more UE devices identified by the information in the respective target list, to the LIS for the lawful surveillance. Since the number of HSSs is expected to be smaller than the number of CSCFs, the proposed method simplifies the LI server interface management. The addition, removal or re-attachment of a CSCF to a different HSS 51 or 53 will be transparent to the LIS 55.

Figure 3:
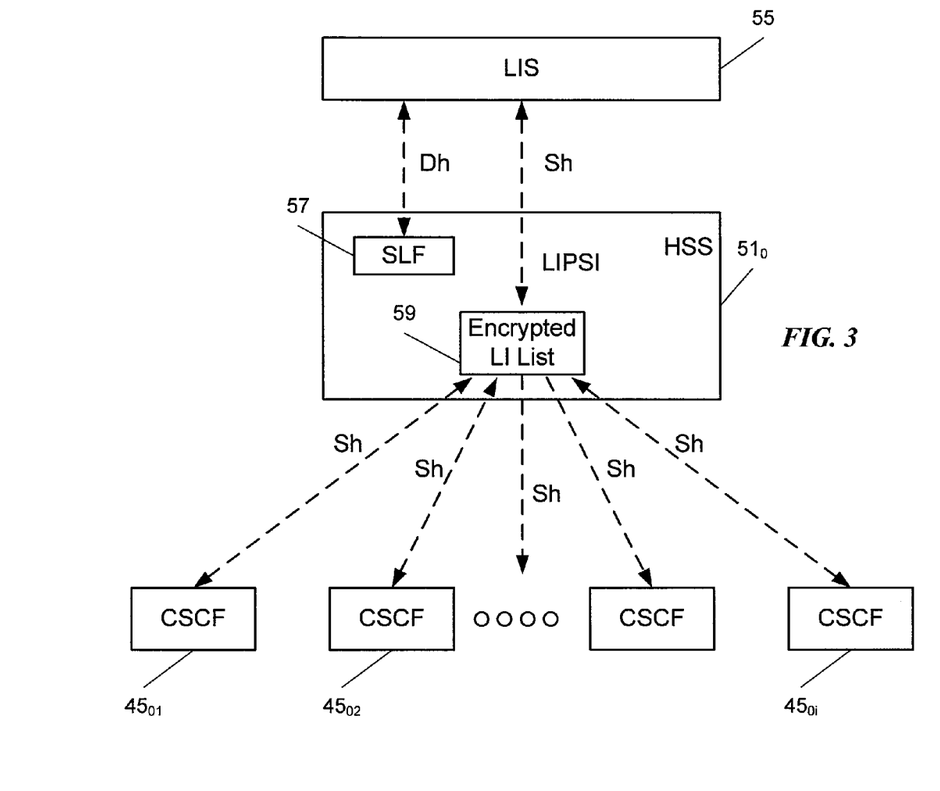
FIG. 3 illustrates the interface architecture in somewhat more detail.

Several techniques may be used to communicate target lists from the LIS 55 to an HSS such as 51 and then to communicate the lists from the HSSs to the respective CSCFs such as shown at 45. The diagram in FIG. 3 depicts the detailed interface architecture, by way of example, with respect to the HSS $51_0$ and associated CSCFs $45_{01}$ to $45_{0i}$. Similar interfaces and communications would be implemented for other HSSs and associated groups of CSCFs.

In the example of FIG. 3, the LIS 55 maintains two logical interfaces. One interface is a Diameter Dh interface with a Subscriber Location Function (SLF) 57. The SLF function 57 may be centrally located or co-located with an HSS, although FIG. 3 illustrates the co-location scenario for purposes of an example. For a co-located scenario as shown (in or associated with HSS $51_0$), an LI Server (LIS) 55 only needs to maintain a Dh interface with one of the HSS instances. There is no significantly added value in maintaining a Dh interface with SLF on every HSS. The Dh interface between LIS and HSS is used to query the SLF 57 to determine on which HSS a particular IMS user is homed. The SLF 57 on or associated with the one HSS (or centrally located) can obtain and provide the requisite information for the LIS 55 regarding the HSS on which the target user is homed. Change to the standard Dh interface for the SLF is not required.

In addition to the Dh interface, the LIS 55 maintains a Diameter Sh interface with each HSS, represented by way of example as an Sh interface with the HSS $51_0$ in FIG. 3. The Diameter Sh interface is used to provision a target onto the HSS $51_0$, which has been identified via the Dh interface with the SLF 57. In practice, the LIS 55 will compile a list of master targets; and from master list, it will carve or parse out lists of targets homed on each of the various HSSs with which it interfaces. For security reasons, the LIS 55 first encrypts the target list for the particular HSS $51_0$, before sending the target list on to the right HSS. The encryption key is known only to CSCFs, and the key may be configured as part of the CSCF activation process.

On each HSS, an Sh transparent data storage 59, identified by a special Public Service Identifier (PSI) for LI is created. This transparent storage 59 is used for storing the lists of LI targets homed on the respective HSS $51_0$, as received from the LIS 55.

In the arrangement of FIGS. 2 and 3, each CSCF maintains a standard Sh interface with the HSS on which it is homed. Hence, the HSS $51_0$ also has a Diameter Sh interface with each of the associated CSCFs $45_{01}$ to $45_{0i}$. The Sh interface between HSS and the respective group of associated CSCFs allows transfer of the encrypted LI target list from storage 59. While the standard Sh interface with HSS is not an IMS standard requirement for CSCFs to support, many CSCF vendors have found that a Sh interface is often required to retrieve data from HSS not supported by the standard Cx interface. Hence, often, the CSCFs available today already support the Sh between the CSCF and the HSS.

Figure 4:
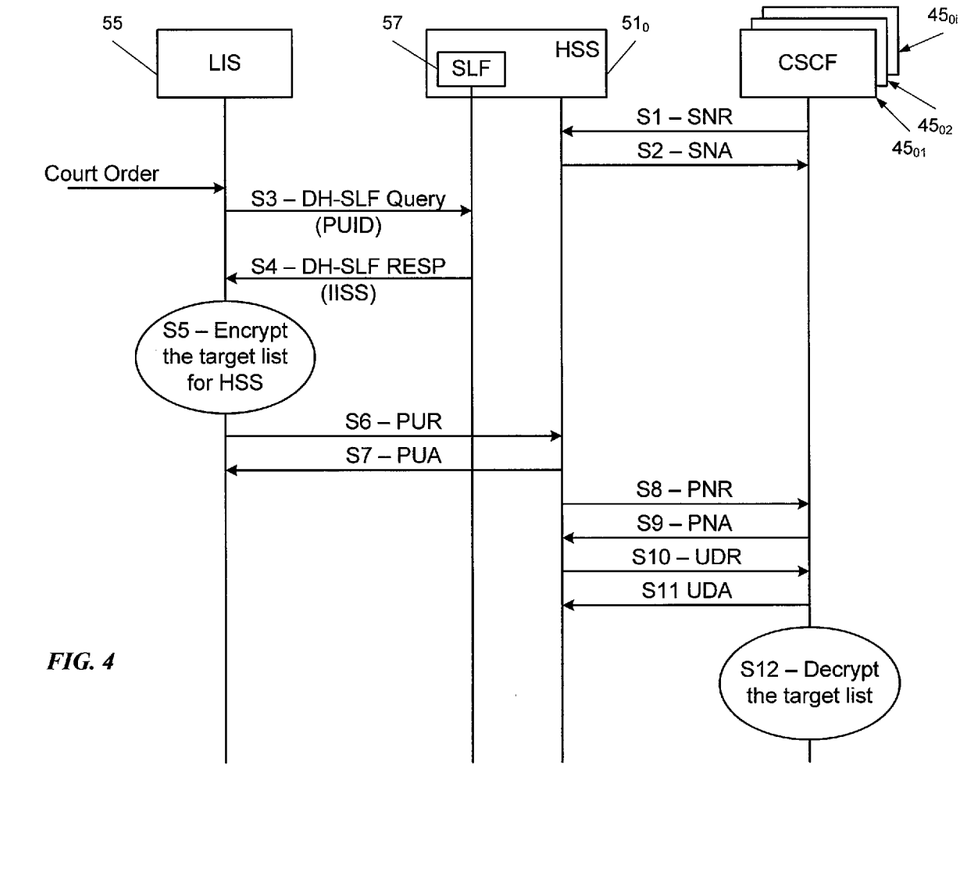
FIG. 4 is a simplified signal flow diagram useful in understanding an example of a methodology for provisioning LI target information onto CSCFs via one of the HSSs.

With the arrangement of FIGS. 2 and 3, let us now consider a sequence of operations or communications steps, as a specific example of the provisioning methodology, with respect to the signal flow diagram of FIG. 4. In the exemplary method of FIG. 4, it is assumed that Diameter interfaces between LIS, HSS and CSCFs have been properly established. The LI PSI storage has been created on the HSS. The agreed encryption key between LIS and CSCF for decrypting the LI target list has been properly configured on the CSCFs.

At step S1, when a CSCF is first deployed, the diameter Subscriber Notification Request (SNR) command will be sent to the HSS to subscribe to changes to LI PSI. The HSS acknowledges and sends back a Subscriber Notification Answer (SNA) in step S2.

As shown at S3, when a court order arrives, LI personnel (operator) provision information regarding the surveillance target into the LIS; and the LIS issues a DH-SLF-Query to the SLF to locate the HSS homing the LI target. The SLF responds with DH-SLF-RESP message containing the address of HSS for the LI target (S4). The LIS updates the LI target list for the particular HSS with the new target information, and the LIS encrypts the updated LI target list.

At S6, the LIS sends a Profile Update Request (PUR) message to the HSS on which the new target is homed, instructing the HSS to update the LI target list stored by LI PSI. The message includes the revised target list, with the new target information, in encrypted form. The HSS stores the encrypted target list, in LI PSI storage. Then, the HSS acknowledges the target list with a Profile Update Answer (PUA) command sent back to LIS (S7).

In step S8, the HSS sends a Profile Notification Request (PNR) to CSCFs which have subscribed to changes to LI PSI target list, that is to say to the CSCFs with which the particular HSS is associated (at least associated for LI purposes). In this way, the HSS effectively 'publishes' notice to the logically attached CSCFs (which also 'subscribe' to the notification/publication service for LI), indicating the availability of the revised LI target list. At S9, each CSCF acknowledges to PNR with a PNA response message. Each CSCF issues a User Data Request (UDR) to HSS requesting the updated LI target list (S10), and the HSS provides the updated LI target list with a User Data Answer (UDA) to the requesting CSCFs (S11). Upon receiving the updated LI target list from the HSS, each CSCF decrypts and updates its own copy to the new LI target list (S12). At this point, the information regarding the new target is available (with the information on the other targets in the list) in the HSS and the associated CSCFs, to facilitate intercept with respect to signaling and to allow the LIS to obtain intercepted content, in the manner outlined earlier in the discussion of FIG. 1.

As shown by the drawings and the discussion above, the exemplary method is characterized by the following features:
1. LIS provisions LI target list on HSS for CSCF access, in contrast to the approach of provisioning target information directly to CSCF;
2. LIS maintains and uses Dh interface with SLF to query for HSS address for a particular LI target;
3. LIS maintains and uses Sh interface with HSS for storing and propagating LI target list to CSCFs;
4. LIS encrypts the LI target list before sending it to HSS;
5. HSS stores LI target lists using PSI to reference the stored encrypted target list;
6. Each CSCF maintains a Diameter Sh interface with HSS to monitor and receive updated LI target list; and
7. CSCF decrypts the LI target list once it receives target list from HSS.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

3GPP—3rd Generation Partnership Project
AAA—Authentication, Authorization, Accounting
AGW—Access Gateway
AS—Application Server
BGCF—Breakout Gateway Control Function
CALEA—Communications Assist to Law Enforcement Agency
BGCF—Breakout Gateway Control Function
CMS—Call Management System
CMTS—Cable Modem Termination System
CSCF—Call Session Control Function
I-CSCF—Interrogating-Call Session Control Function
P-CSCF—Proxy-Call Session Control Function
S-CSCF—Serving-Call Session Control Function
EVDO—Evolution Data Only
HSS—Home Subscriber Server
IAPs—Intercept Access Points
IMS—Internet Protocol (IP) Multi-media Subsystem
IP—Internet Protocol
LEA—Law Enforcement Agency
LI—Lawful Intercept
LIS—Lawful Intercept Server
MG—Media Gateway
MGC—Media Gateway Controller
OA&M—Operations, Administration and Maintenance
PD(E)F—Policy Decision (Enforcement) Function
PDE—Position Determining Entity
PDSN—Packet Data Serving Node
PS—Position Server
SBC—Session Border Controller
SGW—Signaling Gateway
SIP AS—SIP Application Server
UE—User Equipment

What is claimed is:

1. A method of provisioning surveillance target information, for lawful intercept, in an Internet Protocol Multi-media Subsystem (IMS) communications network, the method comprising steps of:
receiving a target list containing information regarding one or more user equipment (UE) devices identified as surveillance targets for lawful intercept, from a Lawful Intercept Server (LIS) at one Home Subscriber Server (HSS) among a plurality of HSSs of the IMS communications network,
wherein:
each of the HSS's among the plurality of HSS's receives a target list from the LIS,
the one or more UE devices identified in the received target list form a subset of UE target devices under surveillance by the LIS, the subset of UE target devices being less than all UE target devices under surveillance by the LIS,
the one or more UE devices identified in the received target list are among UE devices homed on the one HSS for service through the IMS communications network, and the UE devices homed on the one HSS form a subset of UE devices provisioned for service through the IMS communications network, the subset of provisioned UE devices being less than all UE devices provisioned for service through the IMS communications network; and
provisioning the received target list from the one HSS to Call Session Control Function elements (CSCFs) logically attached to the one HSS, to enable the CSCFs to supply intercepted signaling for communications through the IMS communications network for the one or more UE devices identified by the information in the received target list to the LIS for the lawful surveillance, wherein the received target list is different from target lists received at other HSSs.

2. The method as in claim 1, wherein the provisioning step comprises steps of:
storing the received target list in the one HSS;
notifying the CSCFs logically attached to the one HSS of availability of the received target list; and
supplying the stored target list from the one HSS to the CSCFs in response to request messages received from the CSCFs based on the signaling of the availability of the received target list.

3. The method as in claim 2, wherein communications between the one HSS and the CSCFs logically attached to the one HSS utilize a Diameter Sh interface.

4. The method as in claim 3, wherein communications between the LIS and the one HSS utilize a Diameter Sh interface.

5. The method as in claim 4, further comprising storing the received target list in storage in the one HSS for the provisioning thereof into the CSCFs logically attached to the one HSS, wherein the storage is transparent with respect to the Diameter Sh interface and is identified by a Public Service Identifier (PSI) assigned for lawful intercept purposes.

6. The method as in claim 1, further comprising:
receiving a query from the LIS in a Subscriber Location Function (SLF) of the IMS communications network, requesting identification of an HSS on which a new target is homed;
discovering that the new target is homed on the one HSS, from among the plurality of HSSs of the IMS communications network; and
identifying the one HSS to the LIS in answer to the query.

7. The method as in claim 6, wherein communications between the LIS and the SLF of the IMS communications network utilize a Diameter Dh interface.

8. The method as in claim 1, wherein:
the received target list is encrypted by the LIS;
the encrypted target list is stored in the one HSS; and
the step of provisioning the received target list provides the encrypted target list from storage in the one HSS to the CSCFs logically attached to the one HSS for decryption.

9. The method as in claim 8, further comprising provisioning the CSCFs with a key for decryption of the encrypted target list.

10. The method as in claim 1, wherein the IMS communications network provides wireless mobile communications service to UE devices.

11. In an Internet Protocol Multi-media Subsystem (IMS) communications network comprising Home Subscriber Servers (HSSs) and Call Session Control Function elements (CSCFs), an arrangement for supporting lawful intercept comprising:
one of the HSSs; and
a plurality of the CSCFs which are logically attached to the one HSS, wherein:

the one HSS is configured to receive a target list containing information regarding one or more user equipment (UE) devices identified as surveillance targets for the lawful intercept, from a Lawful Intercept Server (LIS), the one or more UE devices identified in the received target list form a subset of UE target devices under surveillance by the LIS, the subset of UE target devices being less than all UE target devices under surveillance by the LIS,
- each of the HSS's among the plurality of HSS's receives a target list from the LIS
- the one or more UE devices identified in the received target list are among UE devices homed on the one HSS for service through the IMS communications network,
- the UE devices homed on the one HSS form a subset of UE devices provisioned for service through the IMS communications network, the subset of provisioned UE devices being less than all UE devices provisioned for service through the IMS communications network,
- the one HSS is further configured to notify the plurality of the CSCFs which are logically attached to the one HSS of availability of the received target list,
- each of the plurality of the CSCFs is configured to obtain the received target list from the one HSSS in response to the notification of the availability of the received target list and to supply intercepted signaling for communications through the IMS communications network for the one or more UE devices identified by the information in the received target list to the LIS for the lawful surveillance
- and the received target list is different from target lists received at other HSSs.

12. The arrangement of claim 11, further comprising a Subscriber Location Function (SLF) for:
- receiving a query from the LIS requesting identification of an HSS on which a new target is homed;
- discovering that the new target is homed on the one HSS, from among the HSSs of the IMS communications network; and
- identifying the one HSS to the LIS in answer to the query.

13. The arrangement of claim 11, wherein:
the one HSS implements a Diameter Sh interface for communication with the LIS, and
the one HSS and the plurality of the CSCFs logically attached to the one HSS implement a Diameter Sh interface, for communications of the plurality of the CSCFs with the one HSS regarding the target list.

14. The arrangement of claim 13, wherein the one HSS comprises an Sh transparent data storage, identified by a Public Service Identifier (PSI), for storage of the target list as received from the LIS and for use in supplying the received target list to the plurality of the CSCFs logically attached to the one HSS.

15. The arrangement of claim 14, wherein:
the Sh transparent data storage stores the target list in encrypted form, as received from the LIS; and
the CSCFs are provisioned with a key for decryption of the target list after obtaining the encrypted target list from the Sh transparent data storage in the one HSS.

16. An Internet Protocol Multi-media Subsystem (IMS) communications network, comprising:
- a plurality of radio access networks, for providing wireless mobile communications service to user equipment (UE) devices;
- a plurality of Call Session Control Function elements (CSCFs) associated with each respective one of the radio access networks, for controlling communication sessions for the UE devices through elements of the respective radio access network; and
- a plurality of Home Subscriber Servers (HSSs), each HSS having a group of the CSCFs logically attached thereto, for providing database services to the CSCFs regarding the UE devices obtaining service through the IMS communications network, wherein:
  each of the HSS's among the plurality of HSS's receives a target list from the LIS,
  each one of the HSSs implements a communication interface for receiving a respective target list containing information regarding one or more UE devices identified as surveillance targets for lawful intercept, from a Lawful Intercept Server (LIS), the respective target list received from the LIS including information on one or more UE devices forming a subset of all UE target devices under surveillance by the LIS, the one or more UE devices identified in the respective target list received from the LIS being among UE devices homed on the one HSS for service through the IMS communications network from among all the UE devices obtaining service through the IMS communications network;
  each HSS includes storage for storing the respective target list received from the LIS;
  the HSSs and the CSCFs implement a communication interface there between for communication regarding the lawful intercept;
  each group of the CSCFs is configured to obtain the respective target list from storage in one of the HSSs to which the CSCFs of the group are logically attached, via the communication interlace between the group of CSCFs and the one HSS; and
  each of the CSCFs is configured to supply intercepted signaling for communications through the network for the one or more UE devices identified by the information in the respective obtained target list, to the MS for the lawful surveillance; and
  the received respective target list is different from target lists received at other HSSs.

17. The IMS communications network of claim 16, further comprising a Subscriber Location Function (SLF) for:
- receiving a query from the LIS requesting identification of an HSS on which a new target is homed;
- discovering one of the HSS on which the new target is homed, from among the HSSs of the IMS communications network; and
- identifying the discovered HSS to the LIS in answer to the query.

18. The IMS communications network of claim 17, wherein the SLF provides a Diameter Dh interface for communications with the LIS.

19. The IMS communications network of claim 16, wherein:
the storage of each HSS stores the respective target list received from the LIS in encrypted form, as received from the LIS;
each of the CSCFs obtains the respective target list from the storage in the encrypted form; and
each of the CSCFs is provisioned with a decryption key for decrypting the respective encrypted target list.

20. The IMS communications network of claim 16, wherein the communication interfaces are Diameter Sh interfaces.

* * * * *